United States Patent Office 3,197,041
Patented July 27, 1965

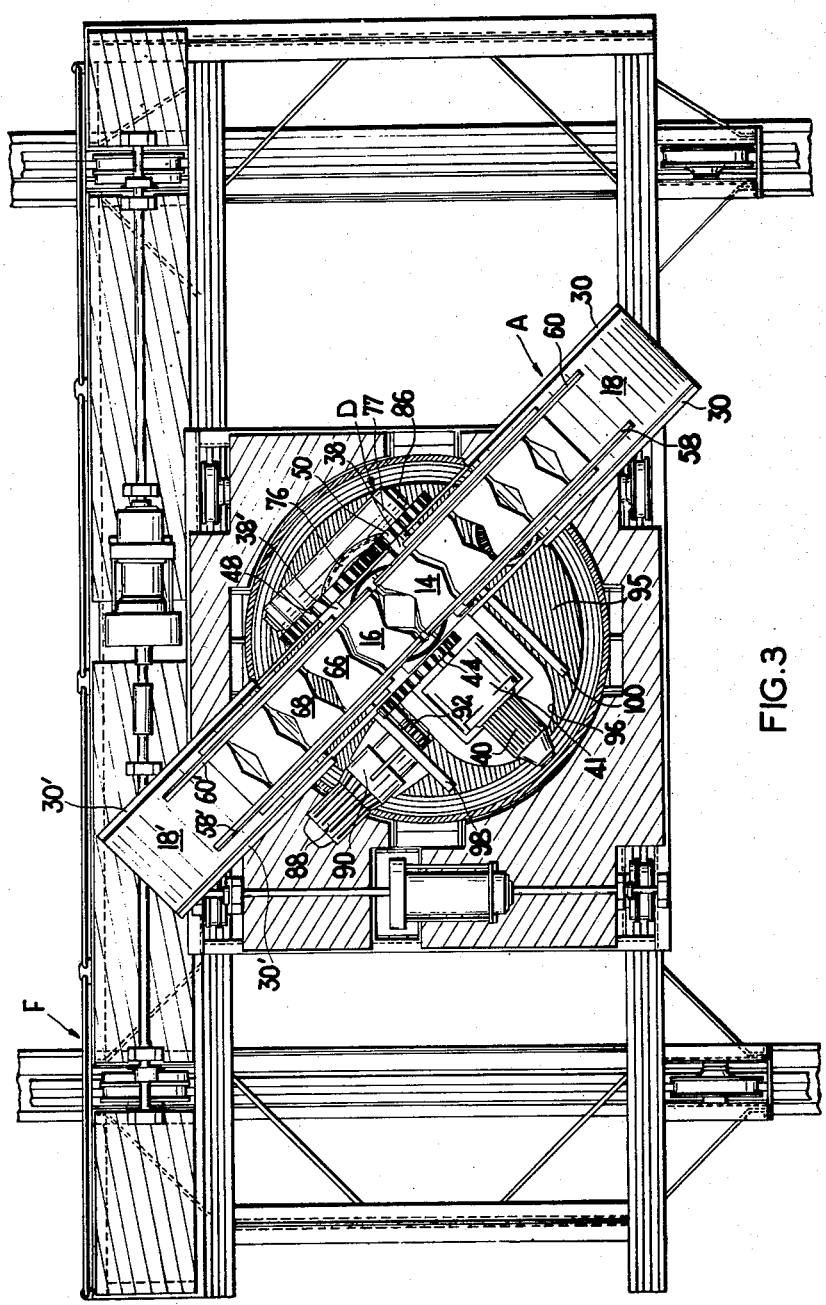

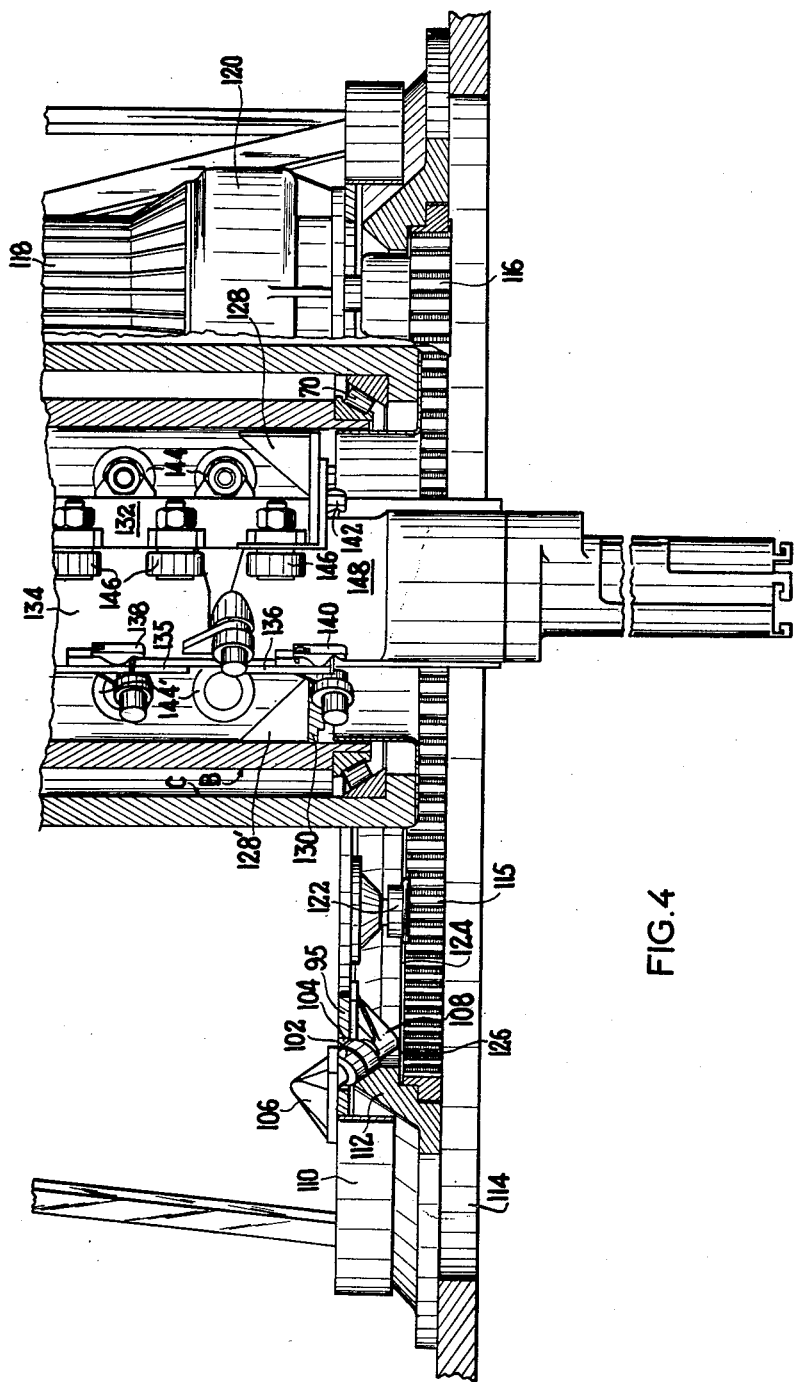

3,197,041
MANIPULATOR APPARATUS
Horst Hermann, Leopoldsburg, Belgium, assignor to European Atomic Energy Community, Brussels, Belgium
Filed Jan. 22, 1963, Ser. No. 253,190
Claims priority, application France, Jan. 23, 1962, 885,571
13 Claims. (Cl. 214—1)

This invention relates to manipulator apparatus of a type especially though not exclusively useful in nuclear installations for the handling of objects in dangerously radioactive surroundings from a remote station. For this purpose, the manipulator arm devices used may have to attain very great lengths, and conventional such devices have required correspondingly large amounts of space for stowing them when in retracted condition. It is a general object of this invention to provide manipulator apparatus especially though not exclusively suitable for nuclear reactor applications, including an extensible-and-retractable manipulator arm which will require relatively little space for stowage.

In co-pending patent application Serial No. 252,908, filed January 21, 1963, there is described a manipulator arm construction comprising a pair of chain-like assemblies each consisting of a series of interpivoted link members, whereby each assembly has substantial flexibility when separated from the other; the two assemblies are adapted to be fed out over respective paths converging to a straight stretch common to both paths over which the link members of both assemblies are subtsantially coincident; the link members for the assemblies are provided with releasably interengageable means whereby the two assemblies interlock as they reach their coincident condition at said common stretch and thus provide a rigid undeformable manipulator arm of variable length. Conversely when the two assemblies are fed in reverse directions over their paths the link members automatically disengage one another as they diverge from said common stretch so that the two assemblies resume their initially flexible character.

Specific objects of this present invention relate to the provision of various practical mechanisms for operating a manipulator arm device of this character, including inter alia: the provision of means for taking up the two chain-like assemblies into separate coils on retraction of the manipulator arm and divergence of the two chain-like assemblies away from one another; the provision of intermittent feed mechanism for synchronously feeding the successive link members of the two assemblies out of their respective coils towards mutual coincidence and reversely feeding them back into the coils; the provision of improved mounting structure for supporting the manipulator arm device to permit wielding the manipulator arm in its extended condition. In its broad aspects however this invention is not restricted for use with the manipulator arm system disclosed in the said co-pending application, and has as broad objects the provision of improved manipulator apparatus including an extensible-retractable manipulator arm provided with universal mounting means therefore; the provision of means for wielding the arm when extended in a plurality of directions; and the provision of such apparatus for use as an overhead manipulator for the handling of objects below it, e.g. positioned adjacent an overhead charging station of a nuclear reactor for the manipulation of fuel rods and other equipment in the fuel ducts of the reactor. Other objects will appear.

In a basic aspect the invention is directed to manipulator apparatus comprising a manipulator arm, an arrangement retractable to a flexible-coiled condition and extensible to a rigidly extended condition, and structure supporting said arrangement for universal rotational movement about a plurality of axes. Said axes may include a first axis of generally fixed orientation in space, e.g. vertical, and a second axis transverse to the first, e.g. horizontal; preferably said axes further include a third axis coincident with the longitudinal axis of the extended arm.

An exemplary embodiment of the invention will now be described with reference to the accompanying drawings, wherein:

FIG. 3 is an overhead plan view of the apparatus shown in FIG. 2, on a somewhat reduced scale, and shown mounted on a travelling crane gantry;

FIG. 4 is a fragmentary view of the lower section of the apparatus enclosed in the dot-dash outline at the base of FIG. 2 drawn to a larger scale, and with parts in section, on two axial planes of the apparatus.

Figure 1:
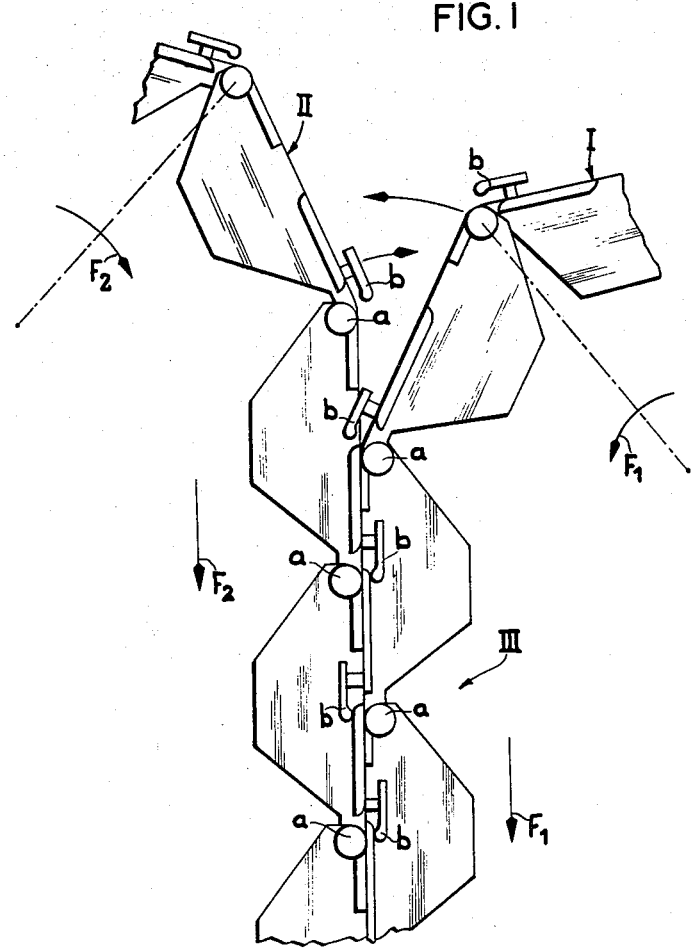
FIG. 1 is a diagrammatic view illustrating a portion of the manipulator arm device disclosed in the afore-mentioned co-pending application, during the intercoupling of the two chain-assemblies on extension of the manipulator arm.

As already indicated, the manipulator apparatus of this invention was specifically developed for use with an extensible manipulator arm of a type shown schematically in FIG. 1 as consisting of two chain-like assemblies I and II each consisting of link members adapted to be stored in separate coils on retraction of the arm and to be simultaneously uncoiled over respective paths (as indicated by the arrows F1 and F2) having a common rectilinear stretch in which said chain-like assemblies are substantially coincident, means being provided for automatically interlockingly coupling the link members of the respective assemblies as they reach said coincident condition, so as to provide a rigid undeformable manipulator arm of variable length as shown at III. Conversely, when both chain-like assemblies are fed simultaneously back in the directions reverse from those indicated by the arrows F1 and F2, the link members of the respective assemblies are automatically uncoupled from one another as their paths separate to permit the respective chain-like assemblies to flex away from each other and be taken up in their respective storage coils. While a detailed description of the construction of the link members and their interconnecting and coupling means will be found in the afore-mentioned co-pending application Serial No. 252,908, it should here be explained for a readier understanding of the present invention that each link member in each assembly is generally V-shaped in transverse cross section with the recesses of the V's of the respective chains facing each other so that, in the coincident condition of the assemblies there is provided a generally tubular rigid arm having a continuous recess therethrough, through which selected objects, e.g. manipulator tools, can be conveyed towards the free end of the arm and back. In longitudinal contour the link members are trapezoidally shaped as seen in FIG. 1 to permit their storage in the coiled condition of each chain-like assembly. Further, adjacent link members in each chain are interpivoted to each other by pivot assemblies generally designated $a$. Each link member has a pair of outturned coplanar flanges at its base (i.e. the side directed towards the opposite chain assembly) with the flanges of the respective chain assemblies engaging one another as the link members reach their coincident condition. The flanges are formed with cutouts, and each link member has a pair of latching arms or levers $b$ secured to its forward end at each side of it and carried by a projecting arm as clearly visible at the top of FIG. 1, so that as the two chain assemblies are fed out from their respective coils in the longitudinally displaced or offset relationship shown in the figure, the latch arms b of each link member project through the cutouts formed in the side flanges of an opposite link member in the other chain assembly, as both said link members approach the coincident straight segment of the respective paths whereupon the latching arm acts to interlock the link member from which it is supported rigidly with said opposite link member of the other chain, and also with the link member of the first chain immediately preceding the first-mentioned link member from which said latching arm is supported; this interlocking relationship between three adjacent link members, two of which form part of the same chain while the third, overlapping the first two, forms part of the opposite chain, serves to impart the rigid undeformable characteristic to the manipulator arm that is formed in the common straight-line stretch III of the paths of the respective chain assemblies in which the assemblies coincide.

Figure 2:
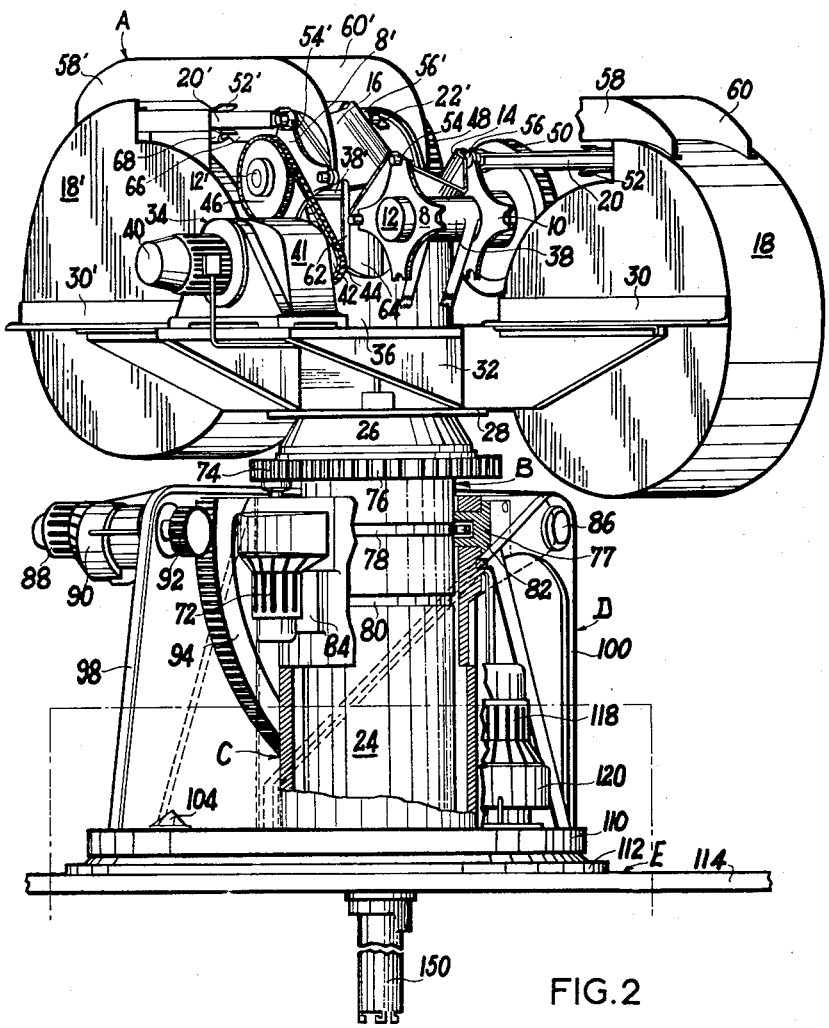
FIG. 2 is a view in side elevation, with parts in axial section, of an embodiment of the manipulator apparatus of the present invention for use with a manipulator arm device of the general type shown in FIG. 1.

Referring now to FIG. 2, the respective chain-like assemblies just described are adapted in their retracted condition to be separately housed within the respective drum-like casings 18 and 18' in which said assemblies are spirally coiled. The casings 18 and 18' form part of an extension-retraction unit generally designated A, and constituting the uppermost section of the manipulator apparatus of the present invention, which apparatus will now be described in its broad lines.

The extension-retraction unit A is mounted atop a tubular pedestal frame member generally designated B. Pedestal member B is mounted for rotation about its normally vertical axis relatively to a surrounding, coaxial, tubular body member C. The body member C is mounted for rotation about a laterally-displaced horizontal rocking shaft 86 in a supporting frame member D, which in turn is mounted for rotation about a vertical axis on a base frame member or platform E. As shown in FIG. 3, the base frame member E is preferably supported on a travelling crane structure for horizontal shifting displacements along two mutually normal directions. It may also be noted from FIG. 3 that the normally vertical common axis of the two coaxial tubular members B and C (which as will presently appear constitutes the longitudinal axis of the manipulator arm when in extended condition) is laterally displaced from the vertical axis of rotation of frame member D on platform E.

Summing up the structure so far described, it will be seen that for any selected pivoted position of the frame member D about its vertical axis relative to platform E, the assembly comprising the coaxial tubular body member C and pedestal member B (with extension-retraction unit A carried thereon) can be swung to any desired inclined position about the horizontal axis of rocking shaft 86. Then the pedestal member B (with unit A thereon) can be pivoted relative to the body member C about the (inclined) common axis of both members, i.e. the axis of the manipulation arm. The extension-retraction unit A can be operated in any selected position imparted to the components just described, to extend the manipulator about the (inclined) common axis of both members, i.e. the axis of the manipulator arm. The extension-retraction unit A can be operated in any selected position imparted to the components just described, to extend the manipulator arm formed by the two chain-like assemblies stored in the coil casings 18, 18', in the manner generally described above with reference to FIG. 1, and the thus extended manipulator arm can be projected through the central recess of the tubular pedestal B and through further recesses provided in the frame member D and platform E. Thus a manipulator tool and any object grasped thereby, at the free end of the manipulator arm, can have imparted to it any desired position with universal freedom.

The components summarized above will now be described in greater detail, starting with the extension-retraction unit A.

The afore-mentioned coil casings 18 and 18' are supported with their axes horizontal and with their midplanes lying in a common vertical plane containing normally the vertical common rotational axis of the members B and C, as will be apparent from FIG. 3. However, the axes of the two housings are positioned at different elevations with the axis of casing 18' being at a higher elevation than that of casing 18, by an amount corresponding to one half the length dimension of a link member, for reasons that will be apparent from previous explanations given with reference to FIG. 1, and will be again referred to later. The means for supporting casings 18, 18' on top of pedestal member B include a frustoconical top section 26 secured to the top of the pedestal member, a flat plate 28 secured across the top of section 26, and two pairs of angle members 30 and 30' respectively, having the end walls of casings 18 and 18' secured between the vertical flangs of the angles. The plate 28 also suports a bracket 32 on which is supported a motor and transmission unit 34, later described.

The means associated with the respective coil casings 18 and 18' of the extension-retraction unit A for feeding the chain assemblies from the respective coils into the mutually coupled relationship earlier described and for retracting them back into their separate coils, are generally similar and symmetrical except for the difference in elevation already noted between them. Accordingly the ensuing description will refer principally to the means associated with coil casing 18; the corresponding components of the assembly associated with casing 18' are designated by the same reference numerals primed.

In the casing 18 are mounted a pair of spirally coiled guide channels spaced axially of the casings, and only one, 52, of which is visible in the drawing. The guide channels, which may extend over say two or more convolutions within the casing, are engaged by rollers, such as 54, 56, mounted on the projecting pivots projecting from each side of each link member and generally designated a in FIG. 1, so as to guide said link members into and out of their coiled condition within the casing. Externally of the casing 18 the guide channels such as 52 are extended by guide rails 20 and 22 which perform a similar guiding function except that they coact with end trunnions of the pivot assemblies a rather than with the rollers thereof, as explained in the co-pending patent application mentioned above.

Associated with the casing 18 and positioned in line with the upper exit aperture of it, some distance away from it towards the normally vertical axis of pedestal member B, is a Geneva cross device which comprises a shaft 12 mounted for rotation in a bushing 38 parallel to the axis of casing 18 and supported from an upper extension 36 of pedestal member B above the mounting bracket 32. Secured on the opposite ends of shaft 12 for simultaneous rotation in mutually registering relationship are a pair of opposite Geneva cross gears 8 and 10 each formed in a generally conventional manner with four radially projecting arms interconnected by concave circular arcs. Each arm of each Geneva gear is formed with a notch to receive the opposite end trunnions of the pivot assemblies a of each link member, as said trunnions are advanced along the guide rails 20, 22 towards the Geneva gears during an arm-extending operation. The arms of the Geneva gears 8, 10 are provided adjacent the end notches with internal shoulders, not shown, for engaging the rollers of the pivot assemblies a.

Both Geneva cross assemblies 8–10 and 8'–10' associated with the respective casings 18 and 18' are driven in synchronism in reverse directions (i.e. both towards or both away from the axis of pedestal B) from the drive unit 34 mentioned above. This drive unit herein includes an electric motor 40 driving a reducer gearing 41.

The reducer output shaft carries a sprocket gear 42 coupled by way of a drive chain 44 to a sprocket 46 secured on shaft 12'. Both shafts 12 and 12' are coupled for synchronous rotation by means of meshing gears 48 and 50.

It will be readily understood that with the arrangement just described and in the light of the explanations given with reference to FIG. 1, rotation of motor 40 in one direction will rotate the two Geneva gear assemblies 8–10 and 8'–10' one way, e.g. both towards the axis of pedestal B as seen above the shafts 12, 12', to impart intermittent displacement to the link members of the respective chain assemblies for uncoiling them out of their respective casings 18 and 18', and opposite rotation of motor 40 will rotate the Geneva assemblies the opposite way to coil up the chain assemblies in their respective casings. When the Geneva gears are rotated to feed out the chain assemblies, the link members of the respective chains are fed inward and downward and towards a common vertical downgoing path section, corresponding to the stretch designated III in FIG. 1, in which the link members of the opposing chains have the outer flat surfaces of their side flanges coinciding on opposite sides of a common vertical plane, and owing to the vertically offset relationship present between the two coil casings 18 and 18' and between the related Geneva gear assemblies, the link members of the two chains assume in said common vertical path section the overlapping relationship shown in FIG. 1. As earlier explained, moreover, the latch elements b of each link member operate as the link members approach said common path section to interlock a set of three adjacent link members of the two chains into a rigid undeformable structure. Thus, below the point of coincidence of the two chain-like assemblies between the two Geneva systems 8–10 and 8'–10', all the link members of both chains are positively interlocked to form a rigid manipulator arm. Conversely, when the motor 40 is operated to rotate the Geneva systems in the reverse direction, the latches b of each link member disengage the opposite link member as the link members successively move past the point of separation of their respective paths, so that the individual chain assemblies are restored to their initial flexible condition and can then be taken up smoothly into the coils within the respective casings 18 and 18'.

FIG. 2 illustrates a pair of link members 14 and 16 of the respective chain assemblies in engagement with their respective Geneva mechanisms 8–10 and 8'–10' somewhat above the point of coincidence between their respective paths, while the adjacent link members 62 and 64 immediately below them are in the process of intercoupling (or uncoupling depending on the direction motor 40 is assumed to be rotating). It may be noted to facilitate the interpretation of the drawing that in FIG. 2 link member 64 is seen from its outer or convex side, whereas link member 62 is seen from its inner or recessed side. Two further link members 66 and 68 are partly seen beyond member 16 in the same chain as it. In the other chain however the link members beyond member 14 have not been shown for the sake of clarity.

The pedestal member B atop which the extension-retraction unit A just described is supported, essentially comprises a tubular element 24 at its upper and lower ends so as to enable the manipulator arm formed by the intercoupled chain assemblies to pass freely through it. As best seen in FIG. 4, the tubular part 24 is coaxially positioned within the tubular body member C and is rotatable therein about the common axis of both members B–C by way of a set of roller bearings interposed between the lower end of pedestal part 24 and an inturned flange at the lower end of body member C. Secured to the upper end of body member C and eccentrically hereto is an annular plate 77 through which body member C is supported for rocking movement from frame member D about horizontal shaft 86 as presently described.

Mounted on the outer side of body member C near its upper end is a drive unit including an electric motor 84 serving to rotate the pedestal B (and with it extension-retraction unit A) relatively to body member C. For this purpose the output pinion 74 of motor 72 meshes with an annular gear 76 secured around the upper end of pedestal member B. Motor 72 is preferably provided with conventional brake and/or blocking means. To facilitate relative rotation of pedestal B in body C in the inclined condition of both members and to prevent the pedestal B from dropping out of the body should their bodily inclination exceed 90° to the vertical, the pedestal B is formed in its outer surface with a pair of axially spaced annular grooves 78 and 80 in which are positioned rollers mounted on the body member C. As shown, the upper groove 78 may contain two rollers one of which is visible at 82, and the lower groove 80 may contain a single additional roller resiliently mounted in a bearing 84 secured to body member C. The three rollers are preferably spaced 120° around the common axis of the members B and C.

To provide for the bodily rocking or swinging movements of the tubular body member C, tubular pedestal B and extension-and-retraction unit A mounted thereon about a horizontal axis, the annular member 77 secured to the top part of body member C is pivoted about the horizontal shaft 86 journalled in suitable bearings between a pair of transversely spaced parallel, vertical flanges 98 and 100 upstanding form a baseplate 95 (see FIG. 4). The baseplate 95 and the pair of flanges 98, 100 secured to it constitutes the frame member D previously referred to, which in turn is mounted for rotation about a vertical axis as will be presently described. The swinging movements of the structure about shaft 86 are produced by means of a drive unit including electric motor 88, brake 90 and reducer gearing mounted at the top of the vertical flange 98, the output pinion 92 of the reducer (rotatable about a horizontal axis) meshing with an annular gear sector 94 secured laterally to the tubular body C, coaxially with shaft 86. It will be noted from FIG. 2 that whereas flange 98 is generally rectangular with a horizontal upper edge, the opposing flange 100 is of generally triangular shape with a slanting upper edge. Between the two flanges 98 and 100 the rotatable baseplate 95 is formed with a large elongated cutout 96 (see FIG. 3) through which the extended manipulator arm can freely pass.

Plate 95 is mounted for rotation on the base frame member or platform E which comprises essentially an annular plate 112 having a cross section in the form of an inverted V and secured, e.g. with bolts not shown, upon a bedplate 114 formed with a wide opening through it for the passing of the extended manipulator arm. Annular plate 112 is formed with an upwardly diverging frusto-conical annular runway surface which is engaged by three rollers rotatably supported from the plate 95 and spaced 120° around the circumference of the plate. Only one of the rollers, 102, is visible in FIG. 4, it being noted that in this figure the part of plate 95 to the left of the axis of rotation is shown in section on a plane extending through the axis of said roller. The three rollers are mounted for rotation on axes inclined at 45° to the horizontal plane and all intersecting the vertical axis of rotation of plate 95 at a common point. The plate 95 has three openings such as 104 formed in it at points spaced 120° around its periphery for receiving the inclined rollers, and each roller has a pair of oppositely projecting trunnions journalled in bearings 106, 108 secured to the upper and lower surfaces, respectively, of plate 95 at opposite sides of the related opening 104. An annular cover plate 110 is secured around the periphery of plate 95.

For rotating the base plate 95 and supported structure about its vertical axis relatively to the platform E including plates 112–114, there is provided a drive unit including an electric motor 118, brake 120 and reducer gearing mounted on plate 95 on a vertical axis, with the output pinion 116 of the reducer gearing meshing with a fixed internal gear annulus 115 secured to the inner periphery of base-plate 112. To prevent the rollers such as 102 of the plate 95 from disengaging the runway formed in plate 112, there are provided e.g. three flanged rollers such as 122 (FIG. 4) journalled on vertical axes projecting downwardly from the under face of plate 95 and having their flanges engaged in a horizontal annular groove 124 defined between the upper surface of fixed annular gear 115 and an adjacent annular shoulder 126 formed in the plate 112.

Means are provided for guiding the extensible manipulator arm as it passes through the inner bore of tubular pedestal member B. The guiding means are shown as comprising a pair of vertically extending, diametrically opposed angle sections, 132, only one of which is visible in FIG. 4, and secured to the inner side wall of the pedestal part 24 with their recesses facing inwardly towards each other. The angles 132 may be supported at their lower ends from a lower annular segment 130 attached to the inner surface of part 24 by brackets such as 128, 128', and at their upper ends from a similar upper annular segment, not shown. Each of the vertical angles 132 supports two vertical rows of guide rollers from its flanges, the two rows of rollers relating to the illustrated angle 132 being shown at 144 and 146, and it will be observed that the rollers have their axes horizontal and at 90° to one another as between the two rows supported from the respective flanges of each angle. At 144' is partially shown one of the rows of guide rollers supported from a flange of the opposite angle, not shown. It will be readily understood that with this arrangement, the two sets of guide rollers such as 144, 146 of each angle such as 132, can guidingly engage the outer surfaces of the V-shaped link members of a related one of the two chain-like assemblies, as said link members move vertically in rigidly intercoupled relationship up or down through the bore in the pedestal part 24. The manipulator arm is thus centered and prevented from assuming undesirable oscillating motions during extension and retraction manoeuvers.

In FIG. 4, there is partly illustrated the outer part of a link member 134 engaged by the guide rollers of angle 132, as well as the side flanges 135 and 136 of two link members of the opposite chain assembly, with their latching levers 138 and 140 respectively.

It will be observed that the lowermost link member 148 at the free end of the manipulator arm is of particular construction. In the example shown this endmost member is intended to have a manipulator tool coupled to it and is of cylindrical form. The manipulator tool 150 shown is of a type used to handle reactor fuel channel plugs which are required to be displaced both axially and angularly within the reactor channels. The tool 150 is removably coupled to the endmost link member 148 by way of a threaded connection for example. The tool can be removed and replaced with a different tool when the manipulator arm is brought to horizontal condition.

As earlier noted the platform E is mounted on a travelling crane system F (see FIG. 3) whereby the entire manipulator apparatus can be moved along two orthogonal horizontal directions with the manipulator arm in retracted or in extended condition. It will be understood however that the apparatus described may if desired be mounted at a fixed location.

The general operation of the system will be evident from the explanations earlier given. It may simply be observed that drive unit 34 is operated to rotate the Geneva cross mechanisms 8–10 and 8'–10' in synchronism in order to extend or retract the manipulator arm by feeding the chain assemblies out of or into both casings 18, 18' as previously described. When the arm is extended, it extends through the tubular pedestal B, being guided therein by the sets of rollers such as 144–146, and then through the cutout 96 in plate 95 and through the bedplate 112. Regardless of the extended or retracted condition of the arm, the drive unit including motor 84 may be operated to impart to the pedestal member B and hence to the manipulator arm supported by it, any desired angular position with respect to the outer tubular body C; the drive unit including motor 88 can be operated to impart to the body C, pedestal B and manipulator arm any desired inclination about the shaft 86 with respect to the horizontal plane; and the drive unit including motor 118 can be operated to rotate the frame D, body C, pedestal B and manipulator arm A to any desired azimuthal direction about the vertical axis. It is noted that when the structure A–B–C is angled away from the vertical direction by rotation about horizontal shaft 86 through the operation of drive unit 88, then operation of the drive unit 118 causes the manipulator arm to follow a cone about the vertical axis of plate 95, whereas operation of drive unit 84 causes the manipulator arm to perform a simple pivotal rotation about its own axis, i.e. the common axis of the members B and C.

In the fully extended condition of the arm all but the innermost link members of the two chain assemblies are intercoupled, while said innermost members are engaged by the Geneva cross gears and constitute a fixed anchoring for the arm. In the fully retracted condition, all but the outermost link members are coiled up in the casings 18, 18' while the outermost members are engaged by the Geneva gears.

In a prototype embodiment of the invention, the manipulator system generally similar to the one described and shown in FIG. 2 has a total vertical height (with the arm retracted) of about three meters, while the length of the extended arm was about twelve meters. Since the entire height of the apparatus is used in anchoring and guiding the arm in its extended condition, no additional space is required above the apparatus for that purpose and it will therefore be seen that the vertical space requirements for the over-all manipulator system can be greatly reduced as compared to conventional arrangements.

The apparatus has been installed above a nuclear reactor core of a construction in which all but the central fuel ducts of the core extend at varying angles to the vertical, and the universal mounting structure disclosed therefore enabled all the ducts to be served by a single manipulator arm if desired.

It will be apparent that various departures may be made from the details of the single embodiment illustrated and described without departing from the scope of the invention. The main axis of the system is not necessarily vertical as is here the case. Moreover the universal mounting structure comprising, herein, the parts designated B, C, D, E may be advantageously used in connection with extensible-retractable manipulator arms of a design different from the dual-interlocking chain assembly which formed the subject of the earlier identified copending application, although the combination of said mechanism with an arm of that kind is especially advantageous. The said mounting structure may, if desired, assume forms differing from that illustrated and described herein depending on specfic requirements. Thus, in some cases, one or more of the degrees of freedom permitted by the universal mounting system disclosed above may be ommitted where such omission may be consistent with requirements.

What I claim is:

1. Manipulator apparatus comprising a pair of chain-like assemblies each consisting of a series of interpivoted link members whereby said assemblies are flexibly coilable when separate from each other; means for coiling said assemblies in respective coils; means for synchronously feeding out both assemblies from said coils over respective paths converging to a straight stretch common to both paths over which the link members of both assemblies are substantially coincident; means for releasably interlocking the link members of both assemblies as they reach their coincident condition at said common stretch whereby to provide a rigid undeformable manipulator arm; and mounting structure supporting said assemblies, said coiling means and said feeding means for bodily universal rotation in a conical path whereby to wield said arm.

2. The apparatus claimed in claim 1, wherein said mounting structure further supports said assemblies, said coiling means and said feeding means for rotation about an axis generally coincident with said common straight stretch.

3. Manipulator apparatus comprising a manipulator arm consisting of two flexibly retractable chain-like assemblies of interpivoted link members, means for retracting said assemblies and means for extending said assemblies into a substantially rigid arm, and means for wielding said arm comprising mounting structure supporting said assemblies together with said retracting and said extending means for universal rotational movement about a plurality of axes including a first axis of generally fixed orientation in space, a second axis transverse to said first axis and a third axis generally coincident with the longitudinal axis of said manipulator arm.

4. Manipulator apparatus comprising a manipulator arm consisting of two flexibly retractable chain-like assemblies of interpivoted link members, means for retracting said assemblies and means for extending said assemblies to a rigid extended condition, and recessed structure supporting said assemblies together with said retracting and said extending means in overhead relation including means for imparting rotational movement to said assemblies when in extended condition about a plurality of axes including a fixed, generally vertical axis and a generally horizontal transverse axis, said structure being recessed to permit downward extension of said assemblies through the recess therein.

5. The apparatus claimed in claim 4, wherein said plurality of axes include a third axis generally coincident with the longitudinal axis of said arm when extended.

6. Manipulator apparatus comprising a manipulator arm consisting of two flexibly retractable chain-like assemblies of interpivoted link members, means for retracting said arm to a flexibly coiled condition and means for extending said arm to a rigidly extended condition including means for releasably locking said link members together when extended to provide a rigid manipulator arm, and universal mounting structure supporting said arm, said structure comprising a base member; a first frame member rotatable relative to the base member about a first axis having a fixed orientation in space; a second frame member rotatable relative to the first member about a second axis transverse to the first axis; and a recessed third frame member having said arm means supported thereon and rotatable relative to said second frame member about a third axis generally coincident with a longitudinal axis of said arm when extended, said arm being extendable through the recess in said third member.

7. The apparatus claimed in claim 6, wherein said third frame member has means within the recess thereof for guiding and centering the arm.

8. The apparatus claimed in claim 6 wherein said structure is positioned in overhead relation to objects to be manipulated by said system, said first axis is generally vertical and said second axis is generally horizontal, and said structure is recessed throughout to permit downward extension of said arm, through said recessed structure.

9. The apparatus claimed in claim 1, wherein said feeding means comprise a pair of Geneva cross mechanisms positioned adjacent the respective coiling means for engagement with successive link members of the respective assemblies during feed-out and retraction thereof and into said coils, and means for synchronously rotating said mechanisms.

10. Manipulator apparatus comprising a pair of chain-like assemblies each consisting of a series of interpivoted link members, means for separately supporting said assemblies in flexibly coiled condition, a pair of intermittent drive mechanisms positioned adjacent the respective coil supporting means for engagement with successive link members of the respective assemblies and means for synchronously rotating said mechanisms for selectively feeding both assemblies out of said coil supporting means over paths converging towards a common straight stretch over which said assemblies are substantially coincident and retracting both assemblies into the respective coil supporting means; releasably interengageable means on said link members adapted for interlocking engagement as said assemblies approach their coincident condition during feed-out whereby to interlock the assemblies into a rigid undeformable manipulator arm over said stretch and adapted for disengagement as said assemblies diverge away from said stretch during retraction; and mounting structure supporting said assemblies, coil means and feeding means for universal rotation for wielding said arm when extended.

11. The apparatus claimed in claim 10, wherein said intermittent-drive mechanisms comprise Geneva cross mechanisms.

12. The apparatus claimed in claim 10, wherein said coil supporting means and feeding means are relatively offset in the direction of said common stretch a distance corresponding to one half the length of a link member whereby the assemblies are adapted to be fed out with the link members of one assembly overlapping the link members of the other assembly, and said interengageable means are adapted for interlocking a pair of adjacent link members of one assembly with the overlapping link member of the other assembly.

13. The apparatus claimed in claim 10, wherein the link members of the respective assemblies are shaped to cooperate in defining a generally tubular manipulator arm in said coincident condition.

References Cited by the Examiner

UNITED STATES PATENTS

| | | |
|---|---|---|
| 2,595,134 | 4/52 | Gordon. |
| 2,643,745 | 6/53 | Olszewski. |
| 2,861,700 | 11/58 | James. |
| 3,082,893 | 3/63 | Hollings et al. _____ 214—658 |

GERALD M. FORLENZA, *Primary Examiner.*

HUGO O. SCHULZ, *Examiner.*